United States Patent [19]

Bean et al.

[11] 4,447,743

[45] May 8, 1984

[54] HIGH PRESSURE LIQUID LEVEL MONITOR

[75] Inventors: Vern E. Bean, Frederick; Frederick G. Long, Ijamsville, both of Md.

[73] Assignee: The United States of America as represented by the United States Department of Energy, Washington, D.C.

[21] Appl. No.: 372,861

[22] Filed: Apr. 28, 1982

[51] Int. Cl.³ .............................................. G01F 23/12
[52] U.S. Cl. ...................................... 307/118; 73/313; 73/322.5; 324/207; 340/624; 137/392
[58] Field of Search ................... 73/313, 308, DIG. 5; 324/207; 307/118

[56] References Cited

U.S. PATENT DOCUMENTS

| | | | |
|---|---|---|---|
| 986,210 | 3/1911 | Pearson | 73/DIG. 5 |
| 3,060,370 | 10/1962 | Varterasian | 324/207 X |
| 3,246,176 | 4/1966 | Nazareth, Jr. | 307/118 X |
| 3,505,869 | 4/1970 | Crawford | 73/313 |
| 3,678,750 | 7/1972 | Dinola et al. | 73/313 |
| 4,030,027 | 6/1977 | Yamada et al. | 324/207 |
| 4,144,741 | 3/1979 | Nakamoto et al. | 324/204 X |
| 4,361,835 | 11/1982 | Nagy | 73/313 X |

*Primary Examiner*—Daniel M. Yasich
*Attorney, Agent, or Firm*—Michael F. Esposito

[57] ABSTRACT

A liquid level monitor for tracking the level of a coal slurry in a high-pressure vessel including a toroidal-shaped float with magnetically permeable bands thereon disposed within the vessel, two pairs of magnetic field generators and detectors disposed outside the vessel adjacent the top and bottom thereof and magnetically coupled to the magnetically permeable bands on the float, and signal processing circuitry for combining signals from the top and bottom detectors for generating a monotonically increasing analog control signal which is a function of liquid level. The control signal may be utilized to operate high-pressure control valves associated with processes in which the high-pressure vessel is used.

10 Claims, 8 Drawing Figures

HIGH PRESSURE LIQUID LEVEL MONITOR

BACKGROUND OF THE INVENTION

The U.S. Government has rights in this invention pursuant to Contract No. DE-AC01-13518 between the U.S. Department of Energy and The National Bureau of Standards.

FIELD OF THE INVENTION

The present invention relates to a liquid level monitor for tracking the level of a liquid contained within a closed vessel. More specifically, the present invention relates to a liquid level monitor for tracking the level of a slurry of powdered coal in creosote, contained within a high pressure vessel such as used in processes in connection with the liquefaction of coal. The liquid level monitor generates an output control signal for operating high pressure control valves associated with the coal liquefaction process.

DESCRIPTION OF PRIOR ART

Heretofore, electrical types of liquid level sensors, such as photocell detector systems, have been utilized for determining the level of liquids in closed vessels. Photocell systems of this type are not suitable for use with high-pressure vessels because they require penetration of the photocells and light sources through the walls of the pressure vessel, creating sealing problems; and the application of electrical voltages to the photocell and light source may be hazardous in high-pressure hydrogen environments. Other types of known liquid level detectors include electrical probes disposed in vessel walls which suffer from the same disadvantages as the photocell system, and, in addition, are dependent on the electrical properties of the liquid being monitored for their operation. With the coal slurries being monitored in the present invention, electrical probes are not suitable in that the electrical characteristics of the coal slurry vary with the water content of the coal. Other types of liquid-level meters for various diverse purposes are known, and include magnetic measuring systems having magnetic floats within the liquid level being monitored. However, no suitable magnetic systems are known for high-pressure vessles, and no suitable signal processing circuitry is known for tracking a magnetic float and measuring the liquid level along the entire path that the float travels within a vessel. In summary, a need in the art exists for a liquid level monitor suitable for tracking the level of a slurry of powered coal in a creosote solution disposed within a high-pressure vessel pressurized with hydrogen up to 14 MPa and generating a control signal therefrom.

SUMMARY OF THE PRESENT INVENTION

Accordingly, it is a primary object of the present invention to provide a suitable magnetic float construction and signal processing system for tracking the level of a slurry disposed in a high-pressure vessel.

It is a further object of the present invention to provide a liquid level measuring system which does not require penetration of sensors through the walls of the pressure vessel.

It is another object of the present invention to provide a liquid level measuring system for use with a high-pressure vessel which does not require the application of electrical voltages in the vicinity of the vessel which could potentially ignite the high-pressure hydrogen environment associated with the vessel.

It is still a further object of the present invention to provide a liquid level measuring system for a high-pressure vessel, the operation of which is independent of the electrical properties of the liquid being measured.

It is still another object of the present invention to provide a float construction for a liquid level measuring system having sufficient structural strength to withstand high pressures present within pressure vessels utilized in accordance with processes for the liquefaction of coal.

The objects of the present invention are fulfilled by providing a system for tracking increases in liquid level in a pressure vessel and generating controlled signals therefrom, comprising a float in said vessel moving along a vertical path from the bottom to the top thereof with increases in liquid level, said float including magnetically permeable material; a first magnetic field generator disposed outside said vessel adjacent the bottom thereof for applying an alternating magnetic field to the magnetically permeable material in said float; a second magnetic field generator disposed outside said vessel adjacent the top thereof for applying an alternating magnetic field to said magnetically permeable material in the float; a first magnetic field detector magnetically coupled to the first magnetic field generator through the magnetically permeable material in the float for sensing the strength of the magnetic field in the magnetically permeable material of the float, attributable to the first magnetic field generator and generating a first float height signal as a function of increases in the liquid level; a second magnetic field detector magnetically coupled to the second magnetic field generator through the magnetically permeable material in the float for sensing the strength of the magnetic field in the magnetically permeable material of the float, attributable to the second magnetic field generator, and generating a second float height signal as a function of increases in the liquid level; a first rectifier connected to the first magnetic field detector for converting the first float height signal from AC to DC; a second rectifier connected to said second magnetic field detector for converting said second float signal from AC to DC; and a divider connected to the first and second rectifiers for dividing the second float height DC signal by the first float height DC signal to generate a DC control signal which is a monotonically increasing function of float height.

The improved float construction of the present invention comprises a toroidal-shaped body portion made of plastic. Toroidal bodies of these plastic materials, namely, polypropylene, low-density polyethylene, or cast epoxy mixed with glass microballoons and having specific gravities of 0.90, 0.92, and 0.70, respectively, are provided to allow operator options based on chemical compatibility with the slurry. A plurality of bands of magnetically permeable material are wrapped around the toroidal-shaped body portion and symmetrically-spaced about the circumference thereof. Each of these bands has a circular disk portion on the outboard peripheral surface of the body and a strap portion extending from opposed sides of the disk portion around the toroidal-shaped body through the central opening thereof. In a preferred embodiment, these magnetically-permeable bands are formed from mumetal.

BRIEF DESCRIPTION OF THE DRAWINGS

The foregoing, as well as other objects, features and advantages of the present invention, will become more readily appreciated upon the consideration of the following detailed description of the illustrated embodiments, together with the accompanying drawings, wherein.

DETAILED DESCRIPTION OF THE PREFERRED EMBODIMENTS

Figure 1:
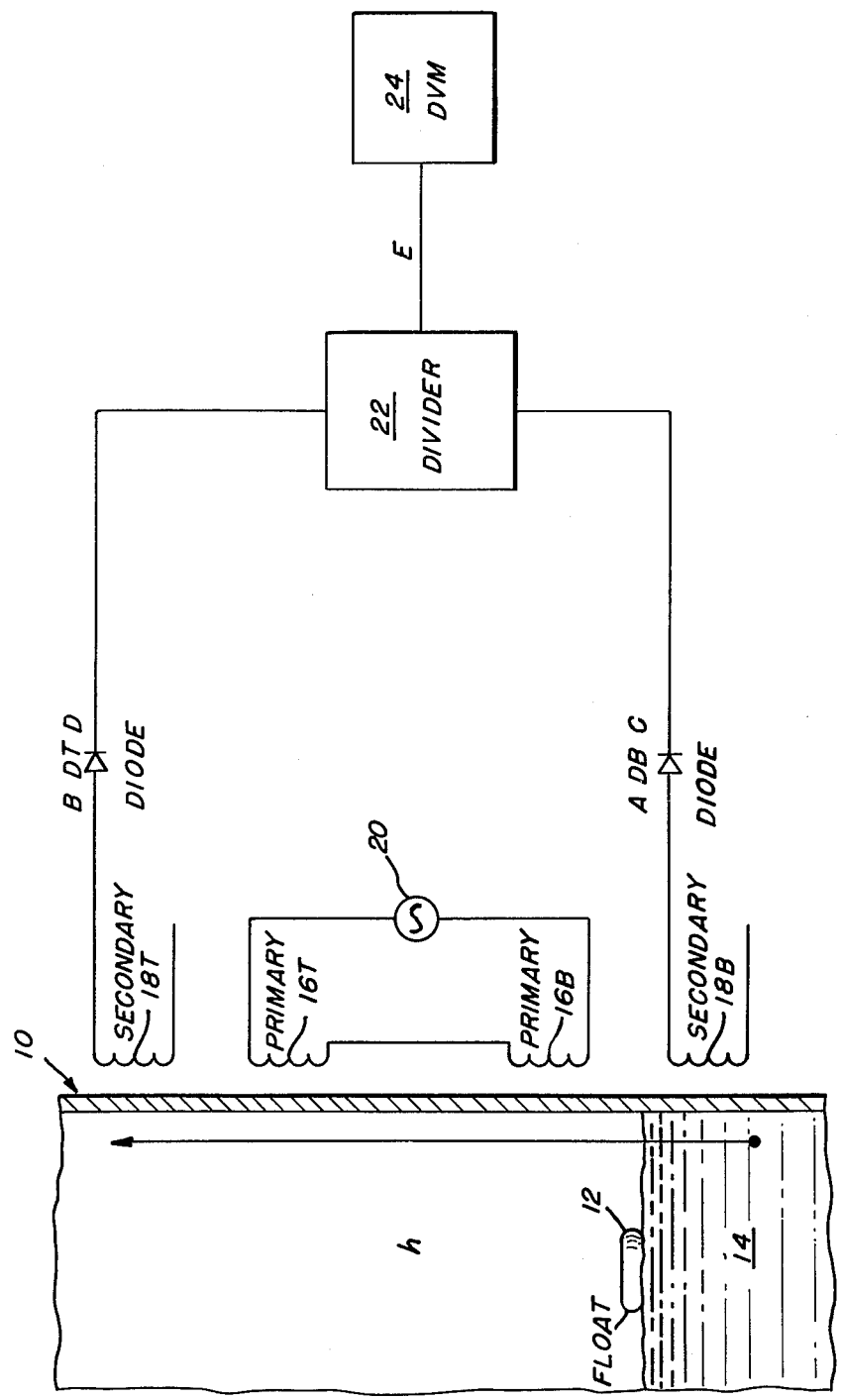
FIG. 1 is a general schematic diagram of the liquid level monitoring system of the present invention.
Figure 2:
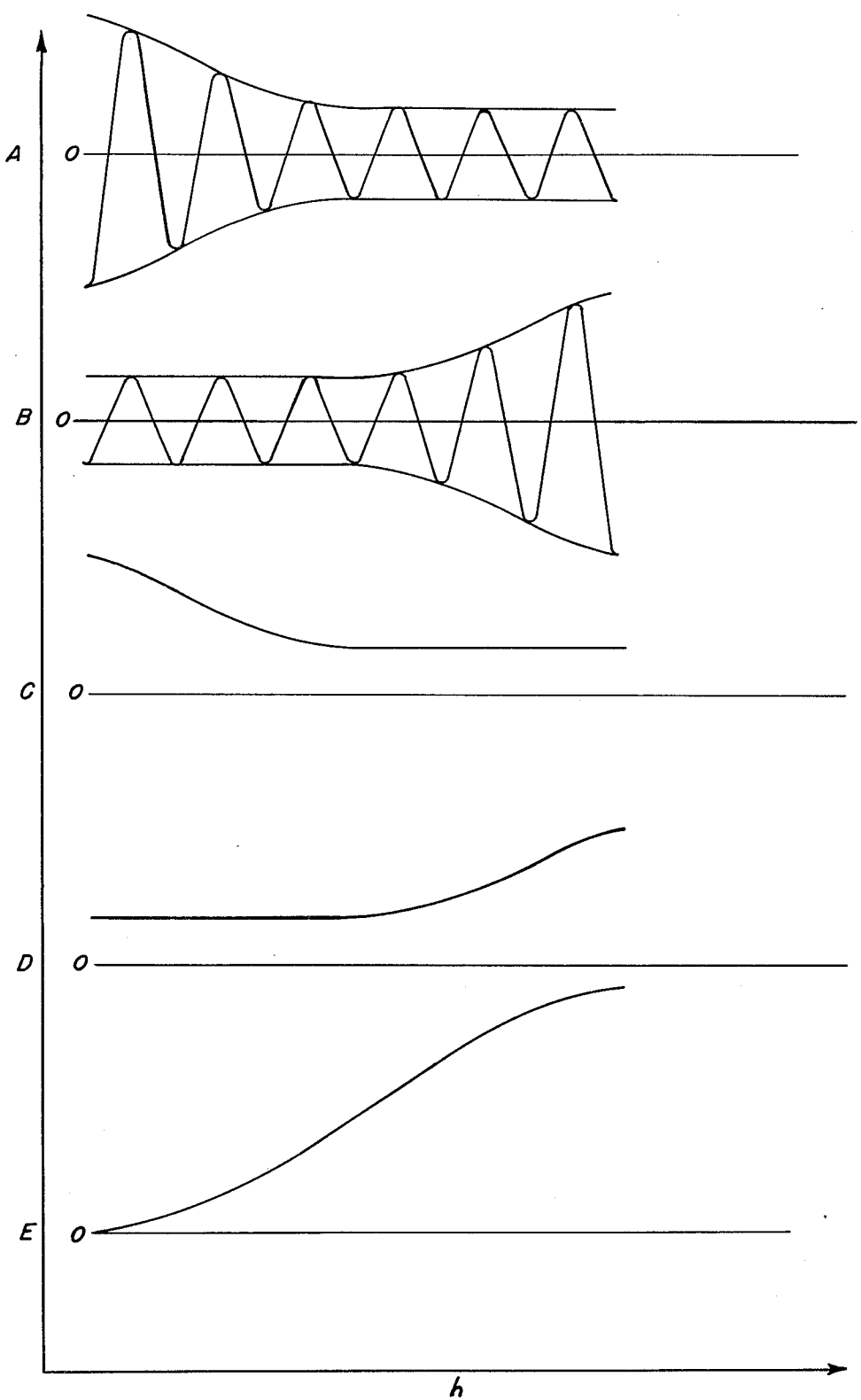
FIG. 2 is an illustration of the waveforms of the signals indicated at the respective points A, B, C, D, and E, in FIG. 1 as a function of the height (h) of the liquid level.

The general block diagram of FIG. 1, in conjunction with the signal waveforms of FIG. 2, illustrate the general operation of the liquid level tracking system of the present invention. The high pressure vessel is generally indicated 10 and includes a liquid, such as a slurry of powdered coal in creosote 14. The vessel 10 may be a stainless steel high-pressure vessel pressurized with hydrogen to approximately 14 MPa (Megopascal). These high pressures are achieved by a pressurized gas such as hydrogen suitably applied to the vessel 10. A float 12 in the shape of a toroid, to be described in more detail with reference to FIG. 7, floats on the surface of the slurry 14 and may be disposed around a guide tube (not shown) extending from the top to the bottom of the vessel 10. The float 12 includes magnetic permeable material which magnetically couples the magnetic field generating and detecting means to be described hereinafter.

The magnetic field generating and detecting means includes two sets of coils, each consisting of a primary coil 16T, 16B and secondary coils 18T, 18B, which may be wound side-by side on the same winding form. The four coils 16T, 16B, 18T, 18B are substantially identical. The winding forms may have any one of a number of suitable configurations which slip over the outside of the pressure vessel 10 are are suitably anchored in place with set screws, so that the respective coils are properly oriented to couple with the magnetically-permeable material in the float 12.

The magnetic field is generated by the primary coils 16T, 16B, disposed at the top and the bottom of the pressure vessel, respectively, and are driven by an alternating current signal from an oscillator 20.

The relative positions of the respective coils are adjusted such that the signal detected by the bottom secondary coil 18B is a maximum with the float 12 in the lowest position within the vessel 10. Conversely, the position of the secondary coil 10 is selected so that the magnetic signal therein is a maximum with the float in the highest position of the vessel 10.

Coupled to the secondary coils 18T, 18B in the system of FIG. 1 is a detector circuit, including diodes DT, DB, for rectifying the output signals of the secondary coils and converting them from AC to DC, a divider circuit for determining the ratio of the recitified signals from the respective secondary coils, generally indicated as 22 (the divider is a commercially available integrated circuit, identified as AD534 available from Analog Devices, Norwood, Mass.), and a digital volt meter 24 for observing the output of the divider 22 for monitoring or calibrating the system operation. It should be understood that the digital volt meter may be replaced or supplemented by a control signal path to a high pressure control valve to be operated by the liquid level tracking system of the present invention.

The character of the signals at the respective locations A, B, C, D and E in FIG. 1, are illustrated by the waveform diagrams of FIG. 2. In operation, let us assume that the float 12 rests on the bottom of the pressure vessel 10. With the float 12 in that position, the signal in the lower secondary coil 18B will be at a maximum due to the coupling of the magnetically permeable material within the float 12. That is, the magnetic material within float 12, to be described in more detail hereinafter, magnetically couples the magnetic field generated by primary coil 16B to the secondary coil 18B. The output of secondary coil 18B is illustrated as curve A in FIG. 2. The sine wave within the envelope of trace A is due to the oscillator 20 driving the primary coils while the amplitude or envelope of the sine wave is due to the primary-secondary coupling between primary coil 16B and secondary coil 18B. As the float 12 rises in the vessel 10 along path h, the primary-secondary coupling between coils 16B, 18B decreases, resulting in a decrease in the amplitude of trace A, as illustrated in FIG. 2. When the trace or signal A passes through the diode DB to point C in the circuit of FIG. 1, the sine wave component and the lower half of the envelope of trace A are removed, leaving only a D.C. signal that is a function of the height h in the pressure vessel, as seen in trace C of FIG. 2.

As the float 12 continues to rise from the bottom to the top of pressure vessel 10 along the height h, the magnetically-permeable material within the float begins to magnetically couple the top primary and secondary coils 16T, 18T, generating a signal at point B at the output of secondary coil 18T. This signal or trace B is illustrated in FIG. 2, and it can be seen that it is a mirror image of the trace A. That is, at the bottom of the vessel 10, signal B is at a minimum, rising to a maximum at the top of the vessel. After rectification by the diode DT, the sine wave portion within the envelope of trace B is removed and only the positive going portion of the envelope remains, as illustrated in the trace C of FIG. 2.

Both of these signals C and D are then input into the divider 22 of the present invention, which computes the ratio of the trace D to the trace C. This ratio is indicated as trace E in FIG. 2 and although this trace is not linear, it is a monotonically increasing analog function of the slurry height h as the slurry 14 rises within the pressure vessel 10. This signal or trace E is a very useful waveform for the purpose of generating a control signal for the operation of high pressure control valves utilized in combination with the high pressure vessel 10. In the preferred embodiment of the present invention, this signal E is a zero to ten volt DC analog output signal utilized for operating high pressure control valves.

Figure 3:
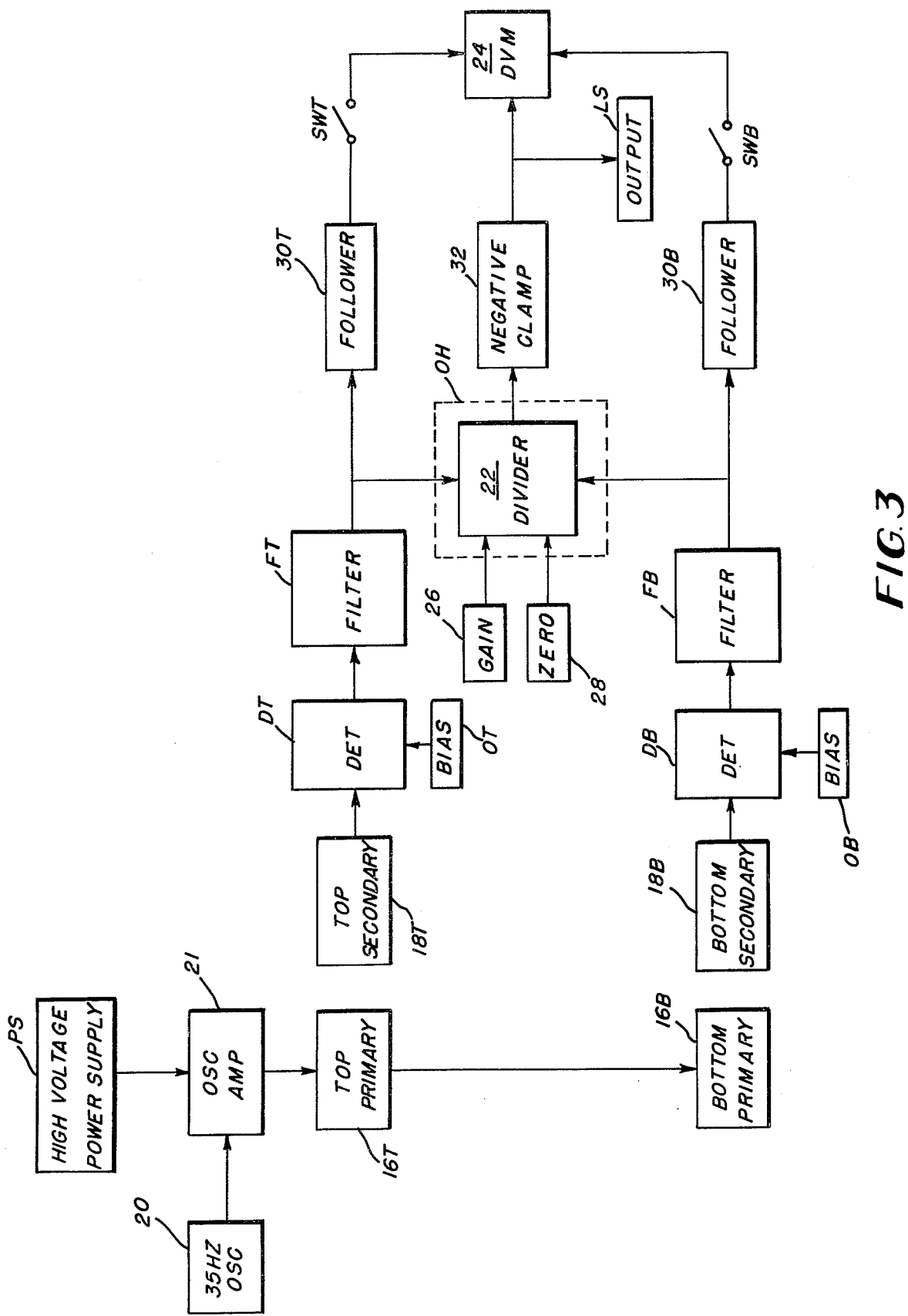
FIG. 3 is a more detailed block diagram of the liquid level monitoring system of FIG. 1 for generating an output control signal.

FIG. 3 is a more detailed block diagram of the control circuitry for the liquid level tracking system of FIG. 1. In addition to the primary and secondary coils and the divider of FIG. 1, there is illustrated the power supply connections to the circuit from a high voltage power supply PS and a plurality of adjustable features of the rectifiers DT, DP and divider 22. For example, the divider 22 is disposed within an oven heater OH to provide temperature stability thereto. The divider 22 is also provided with an adjustable gain and zero circuit 26 and 28, respectively, to be described in more detail hereinafter with reference to FIG. 5. The power supply PS of FIG. 3 is described in more detail hereinafter with reference to FIG. 6. The oscillator circuit of the present invention, including blocks 20 and 21 of FIG. 3 is illustrated in more detail in connection with FIG. 4. Also illustrated in FIG. 3 are offset bias adjustment means OT, OB; smoothing filters FT, FB connected to the output of the rectifiers; emitter follower circuits 30T, 30B, to prevent loading of the digital volt meter 24; switches SWT, SWB, for selectively connecting the digital volt meter 24 into and out of the circuit of FIG. 3; and a negative clamping circuit 32 coupled to the output of divider 22. All of these elements will be described in more detail hereinafter with reference to the detailed circuit schematic of FIG. 5.

Figure 4:
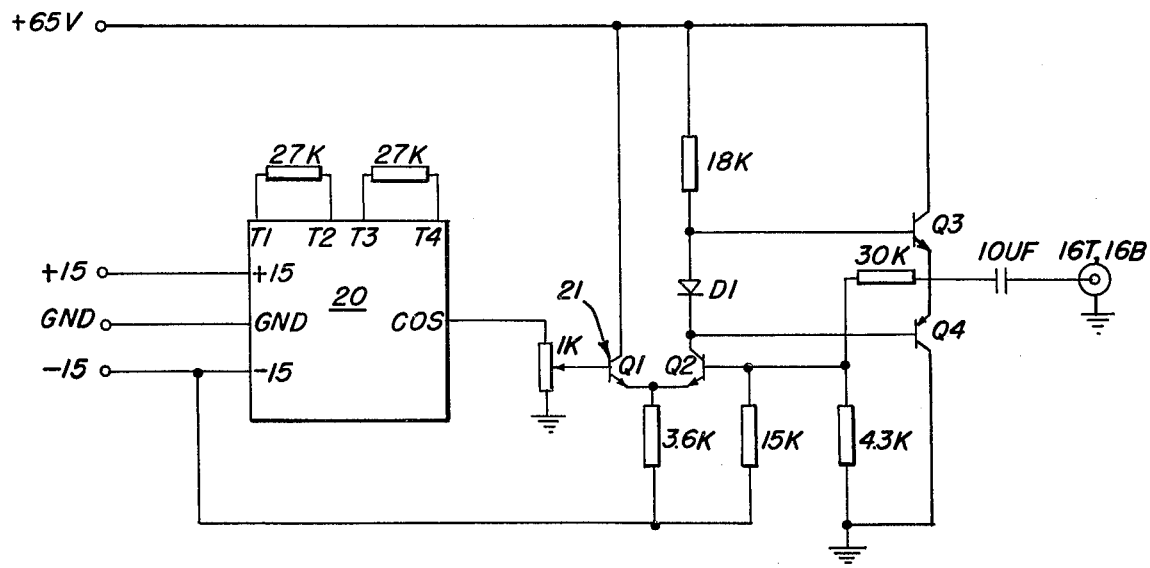
FIG. 4 is a circuit diagram of the oscillator employed in the liquid level measuring system of FIGS. 1 and 3.

Referring in detail to FIG. 4, there is illustrated the oscillator circuit of the present invention comprising a sine wave oscillator module 20 and an amplifier 21. The sine wave module 20 in a preferred embodiment may be a model 442 manufactured by Frequency Devices that is externally trimmed to produce an output frequency of 35 Hz. The module 20 in FIG. 4 is illustrated with commercial pin number designations as indicated in the manufacturers data sheets. The module 20 also has a preset ten volt peak-to-peak output amplitude and is connected to a 1K Ohm potentiometer used to attenuate the output before entering the input of the amplifier 21. The amplifier 21 includes a differential input stage of transistors Q1, Q2 and a complimentary symmetry push-pull amplifier, including transistors Q3, Q4. The oscillator circuit output is taken from the common emitters of Q3, Q4, and is capacitively coupled to the primary coils 16T, 16B, described hereinbefore. The oscillator circuit of FIG. 4 is also provided with suitable bias voltages generated by the high voltage power supply circuit of FIG. 6 to be described hereinafter and applied to the cirucit of FIG. 4 as indicated. In addition, suitable biasing resistors for the oscillator and amplifier circuit of FIG. 4 are provided in the values indicated. A blocking diode D1 is also provided in the transistor selector circuit of Q2 for reasons well known to one of ordinary skill in the art.

Figure 5:
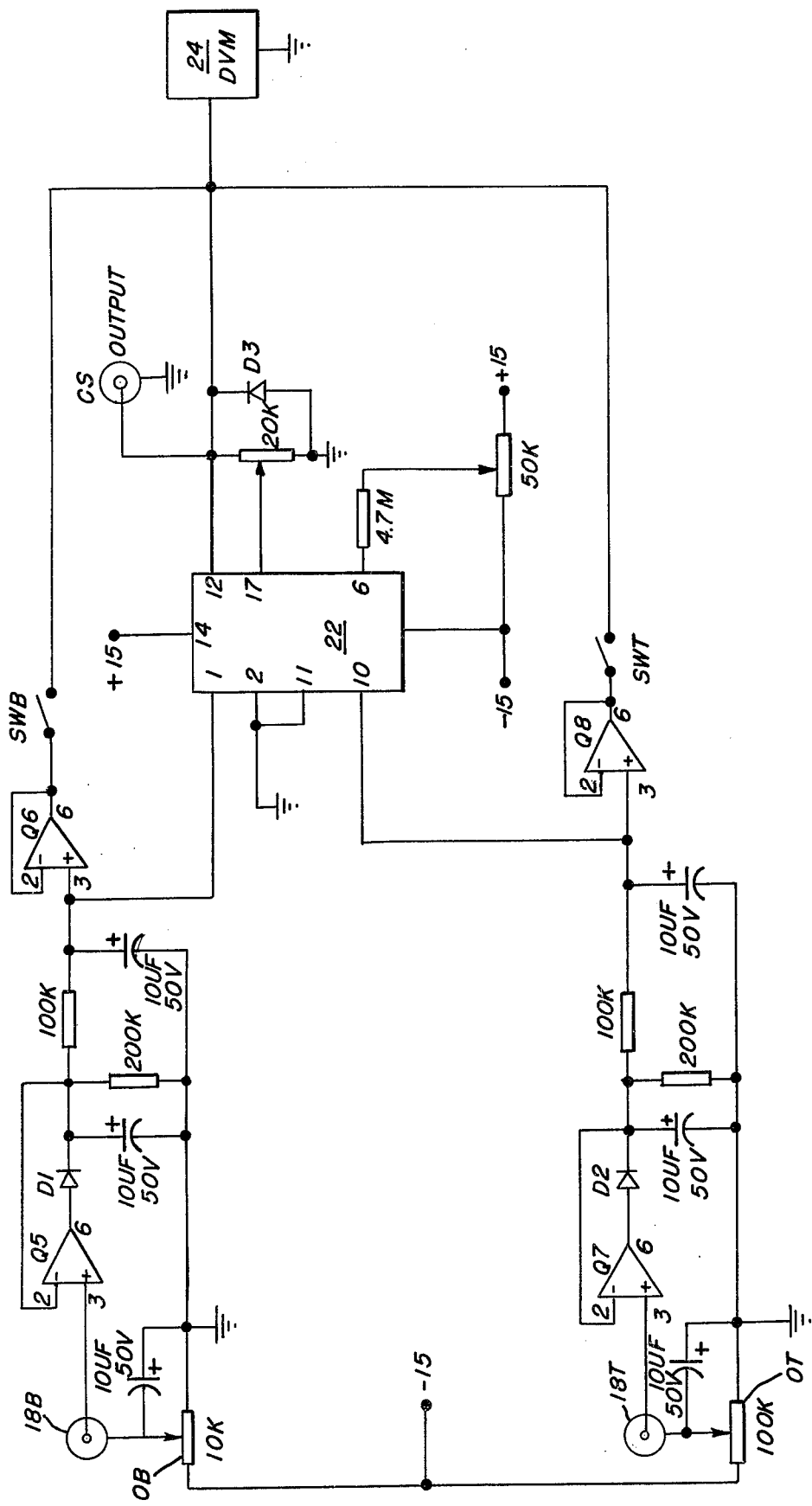
FIG. 5 is a detailed circuit diagram of the detector and divider circuit of the system of FIG. 3.

Referring in detail to FIG. 5, there is illustrated what can be termed "the detector portion of the liquid level measuring system of the present invention" which may be broken down into several smaller circuits for the purposes of explanation. These smaller circuits are: the offset adjustment circuits, the diode detector circuits, the filter circuits, and the follower circuits.

The offset control circuits are provided for each secondary coil 18T, 18B, and are simply a negative DC bias derived from a 10K Ohm potentiometer connected to the inputs of the secondary coils 18T, 18B by the tap of the potentiometer. One end of the potentiometer is connected to ground and the other end is connected to −15 volts and the wiper or tap provides the appropriate DC bias to the secondary coils 18T, 18B. These offset controls are provided to offset or cancel the background levels of background coupling between the primary and secondary coils due to ferromagnetic materials within the region of the pressure vessel exclusive of the magnetic coupling provided by the magnetically permeable material within the float 12. Accordingly, the offset control circuits OT, OB improve the accuracy of the signal detected by the secondary coils 16T, 16B.

The outputs of each of the secondary coils 18T, 18B are coupled to the input of a diode detector or rectifier, as described hereinbefore. In a preferred embodiment, these diode detector circuits are not simple diodes, but rather include diodes connected between the output and the inverting input of an op-amp Q1, Q3 that is connected as an emitter follower to preclude loading of the divider circuit 22. This circuit configuration eliminates the normal 0.6 to 0.7 volt offset that one would receive if a simple diode alone were used as a rectifier, and also eliminates signal variations due to temperature effects. The output is taken from a 200K Ohm resistor connected to the emitter-follower circuit. The signal is then filtered by a simple RC filter including a 100 K Ohm resistor and a 10 microfarad capacitor to smooth the signals and eliminate any ripple.

Additional emitter followers may be provided such as op-amp followers Q6, Q8 to preclude loading of the digital volt meter 24 during calibration modes of operation when switches SWB, SWT are closed, providing a direct signal path to digital volt meter 24. In normal operation, these switches are open, causing the rectified output signals of the respective secondary coils to pass directly to the inputs numbered 1 and 10 of divider 22.

Referring to FIG. 5, the divider 22 in a preferred embodiment of the present invention is a AD534 precision multiplier manufactured by Analog Devices. This multiplier is connected in a divider mode by proper connection of the commercial pin numbers, as illustrated in FIG. 5. In addition, the divider 22 is operated in an oven heater OH to increase the stability thereof by providing a constant temperature environment for its operation. Gain and zero adjustment circuits are also provided for the divider 22. The gain adjustment circuit is coupled to pin numbers 12 and 7, and the zero adjustment circuit is coupled to pin numbers 6 and 8. Zero adjustment is provided by a ten-turn 50K ohm potentiometer connected to the ±15 volt power supply, as illustrated with the wiper of the 50K ohm potentiometer going to terminal pin 6 through a 4.7 Meg Ohm resistor. The 4.7 Meg ohm resistor is also included within the oven heater OH for stability.

The adjustable gain control is provided with a ten-turn 20K ohm potentiometer that is connected between the control output and ground with the wiper thereof connected to terminal pin 7 of divider 22. The output of the divider at pin 12 is externally clamped by a diode D3 in order that the external devices being controlled, such as a high pressure control valve, would only see a positive control signal CS, and never negative drive voltages which may occur if a gross imbalance occurred at the divider input. In other words, diode D3 is a negative clamp for protecting load devices which might be connected to the circuit of FIG. 5.

Figure 6:
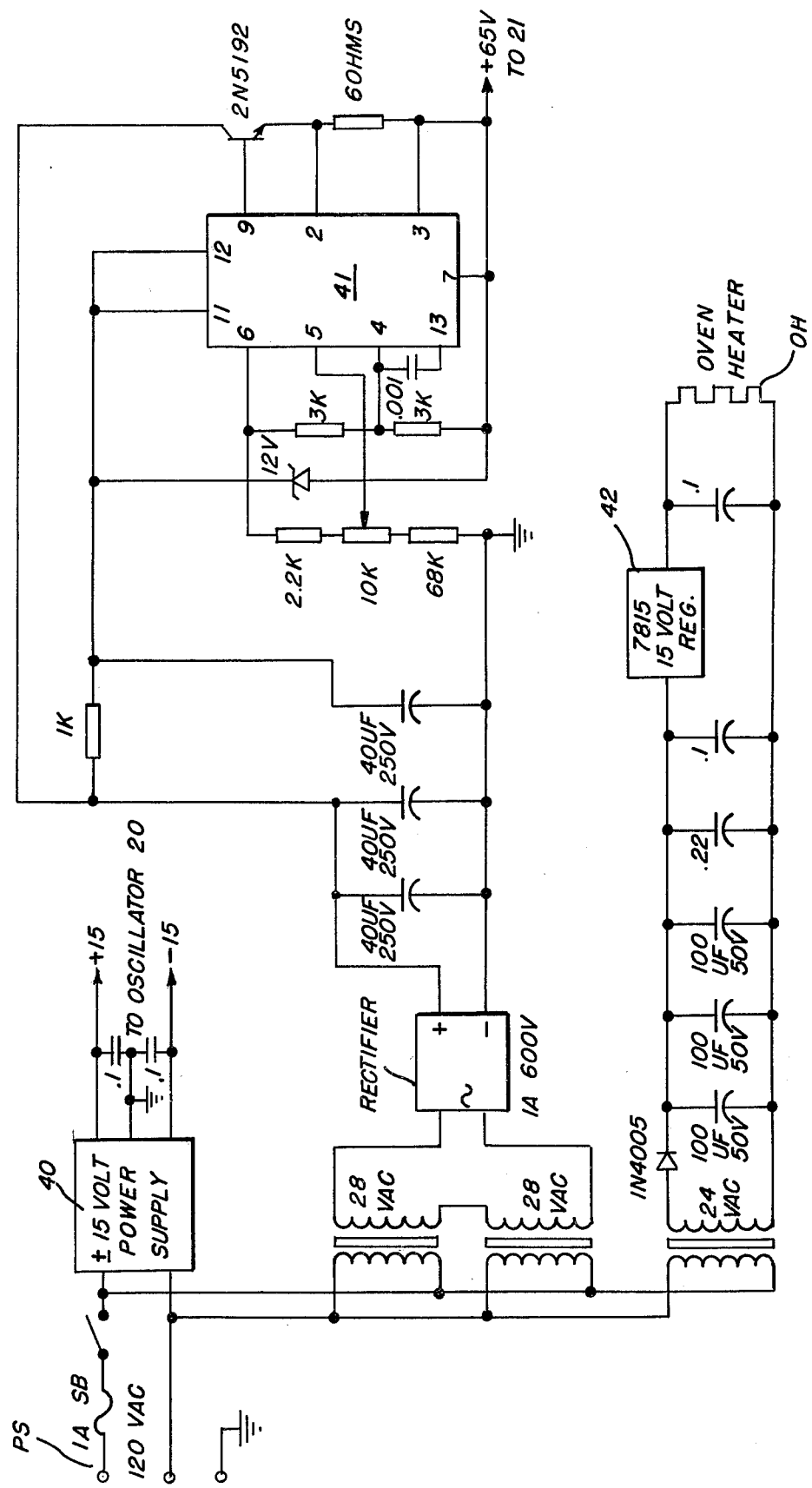
FIG. 6 is a circuit diagram of the power supply circuitry for the various components of the system illustrated in FIG. 3.

Referring to FIG. 6, there is illustrated a detailed circuit diagram of the power supplies for use with the present invention for providing ±15 volts, +65 volts and +15 volts, respectively. The main power input is provided at PS by 120 volt alternating current line voltage coupled through a fuse 1A and on-off switch SB. The ±15 volt power supply may be any commercially available modular unit 40, and is used to supply the op-amps, divider 22, offset adjusters OT, OB, and oscillator module 20, 21, described herein- before. The +65 volt power supply is used solely to provide power to the oscillator amplifier 21 of FIG. 4. This power supply includes an integrated circuit UA723 manufactured by Fairchild Semiconductor. It is a regulated power supply that is adjustable and has an external pass element and is current limiting. It is provided with suitable biasing resistors such as the values indicated in FIG. 6. The +15 volt power supply is used solely to power the oven heater OH and uses an integrated circuit UA7815 manufactured by Fairchild Semiconductor to generate the +15 volts. Suitable capacitive coupling is provided with the values indicated in FIG. 6.

Figure 7A:
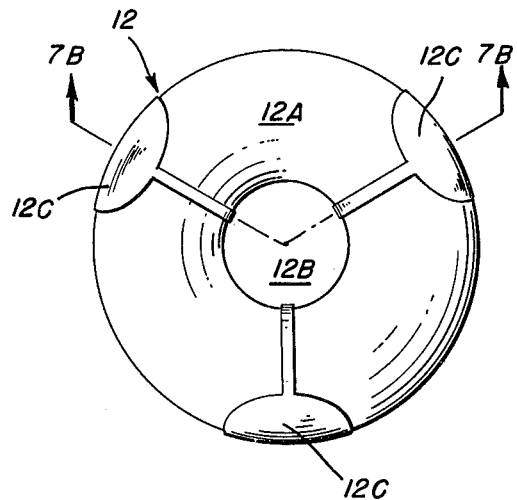
FIGS. 7A, and 7B are top plan and cross-sectional views of the toroidal-shaped float construction of the present invention, the section in FIG. 7B being taken along line 7B—7B of FIG. 7A.
Figure 7B:
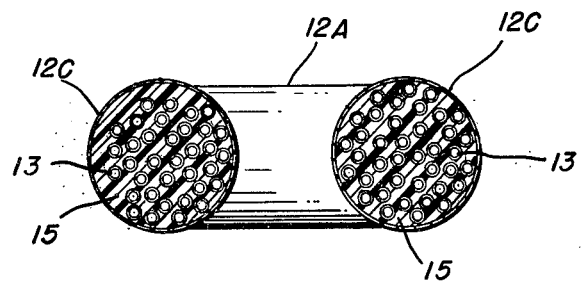

The preferred construction of the toroidal-shaped float of the present invention is illustrated in FIGS. 7A and 7B. The float includes a toroidal-shaped body 12A formed of plastic. In a preferred embodiment, the plastic body is made of solid polypropylene, low density polyethylene, or cast epoxy mixed with glass microballoons having specific gravities of 0.90, 0.92, and 0.70, respectively. Floats of the present invention made of any of these materials have been successfully pressure tested in creosote at pressures up to 30 MPa without failure.

The toroidal-shaped body 12A of float 12 surrounds a central opening 12B. A plurality of bands 12C of magnetically permeable material such as mumetal are symmetrically disposed at circumferentially spaced positions about said body 12A. Each of these bands of metal include a circular disk portion disposed on the outboard peripheral surface of the body 12A and strap portions extending from opposed sides of the disk portion through the central opening of the float. The three bands 12C weigh approximately 1 gram each and are provided to magnetically couple the primary and secondary coils of FIG. 1 in a manner described hereinbefore. The mumetal is a high magnetic-permeability alloy comprising about 74% Ni, 20% Fe, 5.3% Cu, and 0.7% Mn. The mumetal bands 12C may be assembled to the toroid body 12A using soft solder.

It should be understood that the system of the present invention may be modified as would occur to one of ordinary skill in the art without departing from the spirit and scope of the present invention.

What is claimed is:

1. A system for tracking increases in liquid level in a vessel and generating a control signal therefrom comprising:

float means in said vessel movable along a vertical path with changes in said liquid level, said float means including magnetically permeable material;

first magnetic field generating means disposed outside said vessel adjacent the bottom thereof for applying an alternating electromagnetic field to said magnetically permeable material in said float means;

second magnetic field generating means disposed outside said vessel adjacent the top thereof for applying an alternating electromagnetic field to said magnetically permeable material in said float means;

first magnetic field detector means magnetically coupled to said first magnetic field generating means through the magnetically permeable material in said float means for sensing the strength of the magnetic field in the magnetically permeable material of said float means attributable to said first magnetic field generating means and generating a first float height signal as a function of increases in said liquid level;

second magnetic field detector means magnetically coupled to said second magnetic field generating means through the magnetically permeable material in said float means for sensing the strength of the magnetic field in the magnetically permeable material of said float means attributable to said second magnetic field generating means and generating a second float height signal as a function of increases in said liquid level;

first rectifier means connected to said first magnetic field detector means for converting said first float height signal from A.C. to D.C.;

second rectifier means connected to said second magnetic field detector means for converting said second float height signal from A.C. to D.C.;

divider means connected to said first and second rectifier means for dividing said second float height D.C. Signal by said first float height D.C. signal to generate a D.C. control signal which is a monitonically increasing function of float height; and oscillator means for generating an alternating current signal of a predetermined frequency and amplitude for driving said first and second magnetic field generator means, said first magnetic field generator means including a first primary coil means disposed outside said vessel adjacent the bottom thereof and connected to said oscillator means for receiving said alternating current signal, generating an alternating electromagnetic field in response thereto and applying said field to said magnetically permeable material in said float means, said second magnetic field generator means including second primary coil means disposed outside said vessel adjacent the top thereof and connected to said oscillator means for receiving said alternating current signal, generating an alternating magnetic field in response thereto and applying said magnetic field to said magnetically permeable material in said float means, said first magnetic field detector means including first secondary coil means disposed adjacent said first primary coil means and magnetically coupled thereto through the magnetically permeable material in said float means, said first secondary coil means sensing the strength of said magnetic field attributable to said first primary coil means and generating a first float height signal as a function of increases in said liquid level, said second magnetic field detector means including second secondary coil means disposed adjacent said second primary coil means and magnetically coupled thereto through the magnetically permeable material in said float means, said second secondary coil means sensing the strength of said magnetic field attributable to said second primary coil means and generating a second float height signal as a function of increases in said liquid level.

2. The system of claim 1, wherein each of said first and second rectifier means comprises:

operational amplifier means having an input connected to the output of said magnetic field detector means and diode means connected between the output and inverting input of said amplifier means, said output of said amplifier means being connected to an input of said divider means as an emitter follower.

3. The system of claim 2, further including: D.C. bias means coupled to each of said first and second secondary coil means for offsetting the background coupling of magnetic materials between the respective primary and secondary coil means other than the coupling provided by the magnetically-permeable material in said float means.

4. The improved float construction of claim 3, wherein each of said bands has a circular disc portion on the outboard peripheral surface of said body and a strap portion extending from opposed sides of said disc portion around said toroidal-shaped body through the central opening thereof.

5. The system of claim 1, wherein said divider means further includes a gain adjustment means for adjusting the output thereof.

6. The system of claim 1, wherein said divider means further includes a zero adjustment means for adjusting the output thereof.

7. The system of claim 1, wherein said divider means is disposed within a constant temperature heater means.

8. The system of claim 1, wherein said float means comprises:
a toroidal-shaped buoyant body portion; and
a plurality of bands of magnetically permeable material wrapped around the toroidal-shaped body portion and symmetrically spaced about the circumference thereof.

9. The improved float construction of claim 8 wherein said buoyant body is comprised of a plastic composition selected from the group consistin of polypropylene, low density polyethylene and cast epoxy mixed with glass microballoons.

10. The improved float construction of claim 8 wherein said magnetic permeable material comprises mumetal.

* * * * *